Figure 1:
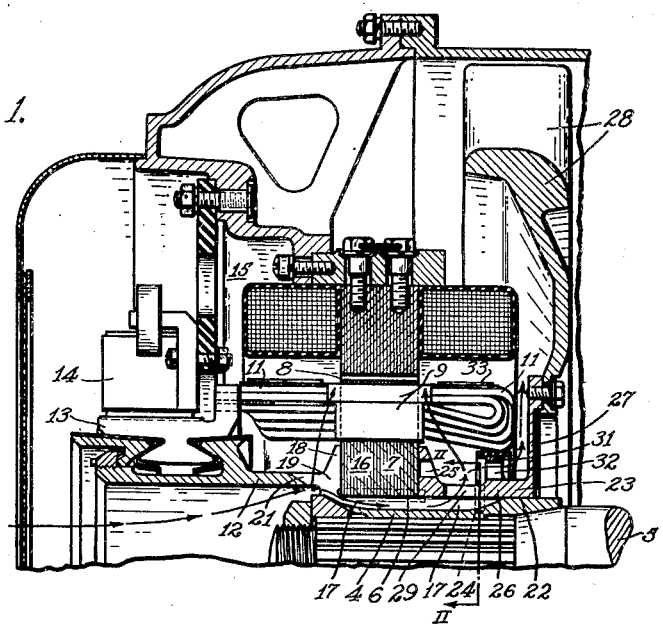

May 6, 1941.  G. A. MOORE ET AL  2,240,663

SPIDER CONSTRUCTION FOR DYNAMOELECTRIC MACHINES

Filed Sept. 30, 1939

WITNESSES:
E. F. Oberheim
Wm. C. Groome

INVENTORS
George A. Moore &
Erich O. Mueller.
BY O. B. Buchanan
ATTORNEY

Patented May 6, 1941

2,240,663

UNITED STATES PATENT OFFICE 2,240,663

SPIDER CONSTRUCTION FOR DYNAMO-ELECTRIC MACHINES

George A. Moore, Edgewood, and Erich O. Mueller, Irwin, Pa., assignors to Westinghouse Electric & Manufacturing Company, East Pittsburgh, Pa., a corporation of Pennsylvania Application September 30, 1939, Serial No. 297,340

8 Claims. (Cl. 171—252)

Our invention relates particularly to a direct-current generator-design of minimum weight, for use in applications, such as on aircraft, where a considerable premium is placed on weight. More specifically, our invention relates to such a machine in which the armature or rotor-member is mounted on an overhanging shaft-end of a prime mover, which is usually an internal-combustion engine or other pulsating-torque machine. Not only does the machine-shaft overhang, or extend beyond its bearings, but the generator-armature overhangs the shaft by a considerable amount, and usually the generator-commutator extends out still further, beyond the end of the shaft, although the commutator may be adjacent to the engine, with rear end of armature overhanging the shaft.

In such a combination, the size of the overhanging shaft-end is determined by the amount of overhang, and the weight of the generator-rotor, and the natural period of the system. The weight of the generator-rotor is largely a function of its diameter, particularly the diameter of the armature core-member, so that, in order to have a minimum weight, it is necessary to design for a minimum armature-diameter.

In the type of design to which our invention particularly relates, the armature-punchings, which constitute the armature-core proper, are mounted on an annular spider, which is, in turn, mounted on the overhanging shaft-end so that the spider also overhangs the shaft. The minimum diameter of the spider is determined by the shaft-diameter and the minimum radial thickness of the tubular or annular spider, which is required to provide the requisite torque transmitting strength. The armature-core is provided with peripheral winding-receiving slots, which must have a sufficient radial depth to accommodate the necessary copper for the armature winding. The inner portion of the armature-core, underneath said winding-receiving slots, is substantially unslotted, so that it will have the maximum possible amount of radial depth, from the bottom of the winding-receiving slots down to the spider, so as to provide the necessary cross-section of iron needed for carrying the armature-flux, without undue saturation. The minimum armature-diameter is thus obtained by mounting the punchings directly upon the spider, and by having the material under the armature-slots just sufficient to carry the total flux required.

The foregoing outline of the principles and considerations underlying the design of a direct-current generator so as to have a minimum armature-diameter, when mounted on the overhanging shaft-end of an internal-combustion engine, will make it apparent that the problem of cooling the armature-member, which is the part of a direct-current machine requiring the most cooling, is a particularly difficult one, especially at the rear end of the machine, or the end which is closest to the gasoline or internal-combustion engine. In fact, the above outlined considerations presented the problem of a dead-air pocket at the rear of the armature, which there seemed to be no way of ventilating, because any holes provided in the lower flux-carrying portions of the armature-punchings would reduce the flux-carrying ability of the punchings, and any holes provided in the shaft would weaken the latter and tend to produce undesirable vibration as a result of the overhanging parts, while the spider was necessarily designed with the minimum possible radial thickness, so that it was very much like a thick-walled pipe, barely strong enough, mechanically, to transmit the necessary torques.

In accordance with our invention, the forgeing problem was solved by causing the spider to extend axially forwardly and backwardly beyond the punching-seat on the spider, so that sufficient strength could be built into the front and rear ends of the spider, to allow for milling a plurality of axially extending ventilating-slots in the periphery of the spider, said slots extending under the armature-core, and for a short distance beyond the same, at each end. These slots would provide means for getting air to the rear end of the armature-core, to relieve the dead-pocket situation, allowing the passage of a sufficient quantity of air to ventilate the rear end-turns of the armature-winding, but it would necessarily very materially weaken the torque-transmitting qualities of the portion of the spider underlying the armature-core. We found, however, that sufficient strength could be built into the portions of the spider beyond the core, to make up for the loss of strength incurred by the milling of the ventilating-slots in the core-seat of the spider, so that the necessary design-requirements could be met, while obtaining an armature-diameter which is smaller than we could have obtained with any previous designs.

Since the stator-member of the generator surrounds the armature or rotor-member, the size of the stator-member is also reduced, so that, as a result of our designs, we have been able to effect a weight-saving of the order of 10% in a five-kilowatt machine, in which the weight would normally vary from 35 pounds to 50 pounds, according to the speed. When it is realized that aircraft manufacturers are willing to pay various amounts, estimated at from $40 to $200, for each pound saved, in the weight of equipment which has to be carried by the aircraft, it will be understood that a saving in the order of 10% of the total weight of the electrical parts of the auxiliary power-plant, to which our invention applies, is an important saving.

Other features and objects of our invention will be better understood from the following description and the accompanying illustration of the invention, which consists in the parts, structures, combinations and methods hereinafter described and claimed, and illustrated in the accompanying drawing, wherein Figure 1 is a longitudinal sectional view showing the top half of a generator constructed in accordance with our invention.

Figure 2:
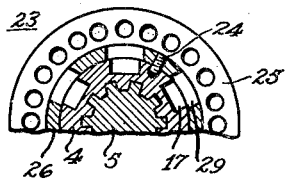
Figure 3:
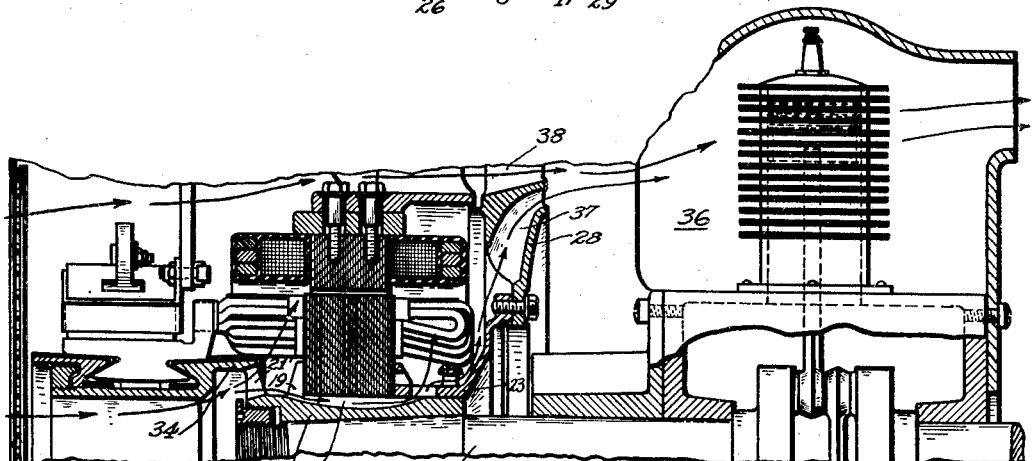

Fig. 2 is a transverse sectional view of the rear end-plate member 23, on the line II—II of Fig. 1, and Fig. 3 is a longitudinal sectional view of a power-plant including an engine and a generator embodying our invention, said generator illustrating a modified form of embodiment of the principles of our invention, as distinguished from the particular form of embodiment of Fig. 1.

In the embodiment of our invention shown in Fig. 1, an annular pipe-like spider 4 is overhangingly mounted on an overhanging shaft-end 5 of a prime mover (not shown in Fig. 1). The annular spider 4 has an intermediate core-seat 6 on which the annular armature-core 7 is mounted, said core consisting of punchings of iron or steel, and being provided with axially extending peripheral slots 8 for receiving the armature-winding 9, said winding having portions which lie within the slots 8, and also extending end-turn portions 11 at each end of the armature-core 7.

At its front, overhanging end, the spider 4 is provided with an annular or pipe-like extension 12 which insulatedly supports the cylindrical commutator 13 of a current-collecting device which also comprises brushes 14 bearing upon the commutator.

The armature-core 7, of the rotor-member which has just been described, is surrounded by the stator-member 15 of the dynamoelectric machine or generator, said stator-member being more or less conventional in its design.

As previously explained, in the statement of the objects of the invention, the armature-core 7 is designed so as to have a minimum radial thickness at its inner portion 16 underneath the winding-receiving slots 8, that is, the minimum radial thickness necessary to provide the required flux-carrying capacity, and to this end, the inner portion 16 of the core is left substantially unslotted, so as to provide the maximum cross-section of iron. Furthermore, as previously explained, the portion of the spider 4 which underlies the armature-core 7 is also designed with a minimum radial thickness consistent with its torque-transmitting requirements.

In accordance with our invention, the coreseat 6 of the spider 4 is provided with a plurality of axially extending ventilating-slots 17 which provide for the necessary flow of air, but which weaken the spider at this point. However, it will be noted, from Fig. 1, that the ventilating slots 17 do not extend axially far beyond the armature-core 7, so that considerable strength can be built into the spider 4, at both ends, beyond the weakened core-seat portion 6. At the front end, the spider 4 merges into an integral annular or pipe-like extension 12 which supports the commutator 13, and at the junction point between the extension 12 and the coreseat 6, the spider is also provided with an integral flange or enlargement 18 which constitutes the front end-plate of the armature, said end-plate constituting an abutment which presses against the front end of the armature-core 7. In accordance with our invention, this front endplate 18 is provided with axially-extending ventilating-openings 19 which register with the ventilating-slots 17 of the spider.

In accordance with our invention, the rear part of the commutator-supporting extension 12 of the spider 4 is provided, in effect, with radially extending ventilating-openings 21 which register with the ventilating openings and slots 19 and 17. In describing our ventilating-openings 21 as being, in effect, radially-extending openings, we mean to indicate that these openings provide the effect of permitting the air to flow from the hollow inside of the front extension 12 of the spider 4, so as to reach the outer periphery of the spider, whether the construction is as shown in Fig. 1 or as shown in Fig. 3, or in any equivalent design.

In further accordance with our invention, the rear end of the spider 4 is finished to provide an extended-surface seat 22 for a rear-end plate member 23. The rear end-plate member 23 is a separate member which is pressed onto the seat 22, with a very tight fit, and doweled in place, as indicated at 24. The rear end-plate member comprises a front end 25 which constitutes the rear end-plate which engages the rear end of the armature-core 7, an intermediate tubular portion 26 which tightly encircles the seat 22 on the rear end of the spider 4, and a rear-end flange 27 which extends away from the axis of the machine, and which carries a ventilating fan 28 for ventilating the machine.

The result of the foregoing construction, as shown in Fig. 1, is to cause the flow of a gaseous cooling-medium, such as air, from the hollow central portion of the overhanging front end 12 of the spider 4, through the ventilating-openings 21 therein, at which point the air-flow divides, a part of the air flowing away from the axis, at the front end of the machine, and past the end-turns 11 at said front end, cooling the same, after which this stream of air passes toward the back of the machine, and to the fan 28, flowing partly through the airgap, between the stator and the rotor, and partly around the pole-pieces of the stator-member 15. The second stream of air, after leaving the radially-extending ventilating openings 21 in the spider-extension 12, passes through the axially-extending ventilating-openings 19 in the front end-plate 18, and through the axially-extending ventilating-slots 17 of the spider 4, and thence through a plurality of radially-extending, registering, ventilating-openings 29 in the intermediate tubular portion 26 of the rear end-plate member 23, from which point the air continues to move radially outwardly, past the rear end-turns 11 of the armature-winding 9, cooling the latter, and then being drawn out by the blades of the fan 28.

The rear end-plate member 23 is designed to add directly to the strength of the spider 4, and in order that this may be so, the rear end-plate member is assembled, with a heavy press-fit, on the spider, and it is doweled in place while being held under pressure. This rigid construction is necessary in order to transmit the pulsating torque of the engine (shown only in Fig. 3) which drives the shaft 5, without danger of destroying the fit of the rear end-plate member 23 on its seat 22 on the spider 4. The spider 4 itself is stronger at its unslotted rear-end seat-portion 22 than at its slotted intermediate core-supporting seat-portion 6, having a radial thickness which is greater at said rear-end seat 22 than underneath the ventilating-slots 17 in said slotted core-supporting seat 6. The rear end-plate member 23 carries the fan 28, which is the part of the rotor-member having the largest radius, so that it gives the largest flywheel-effect, for a minimum weight, of any of the rotating parts. Hence the fan 28 requires this very positive locking of the rear end-plate member 23 to the spider 4.

In most machines, it is necessary, also, to provide coil-supports for supporting the end-turns 11 of the armature-winding 9 at one or both ends of the armature. In the design shown in Fig. 1, it was found that coil-supports were not required at the front end, between the commutator 13 and the core 7. At the rear end, however, it was necessary to provide a coil-support 31 in the form of an annular flange or projection on the intermediate tubular portion 26 of the rear end-plate member 23, and this coil-supporting flange is perforated, as indicated at 32, to permit air-flow therethrough. The armature end-turns 11, at both the front and rear ends of the machine, are banded down as is customary, as indicated at 33.

In the embodiment of our invention as shown in Fig. 3, it was necessary to provide a coil-support for the end-turns 11 at the front end, as well as the rear end; and, to this end, the front extension 12 of the spider 4 is provided with an elevated portion 34 which constitutes the front-end coil-support for the end-turns 11 at the front end of the machine. In the design as shown in Fig. 3, the front-end coil-support or elevated-portion 34 is constructed as an extension on the rear end of the portion which supports the commutator 13, and, in order to save weight, this front-end coil-support 34 is made hollow, so that, in effect, radially-extending ventilating-openings 21' are provided in the rear end of this hollow coil-supporting elevation 34, so that the air can flow slant-wise through said ventilating-openings 21', said air having a component in both a radial direction and an axial direction.

Fig. 3 also illustrates the general combination of the generator and an internal-combustion engine which is indicated at 36, the overhanging shaft-end 5 being the shaft of this engine.

It will be noted that the ventilating air for the direct-current generator, after it leaves the fan 28, passes on, into the internal-combustion engine 36, to cool the latter. It will be noted that the particular type of fan 28, shown in Fig. 3, is constructed with two differently designed blade-portions 37 and 38 of different radii, the inner blade-portion 37 being designed to draw a relatively small amount of air, at a relatively high pressure-head, through the restricted ventilating-openings of the dynamoelectric machine, while the outer blade-portion 38 is designed to draw in outside-air, which does not pass through any restricted passages in the machine, or does not pass through the machine. A relatively large quantity of this outside-air is drawn through the outer blade-portion 38, at a relatively low-pressure head. Both of the blade-portions 37 and 38 discharge air into the engine 36, which requires a much larger quantity of cooling-air than the electric generator.

The inner blade-portion 37, in the design illustrated in Fig. 3, is an improved form of fan-design which is more specifically described and claimed in an application of C. F. Jenkins and R. E. Rambo, Serial No. 297,338, filed September 30, 1939, assigned to the Westinghouse Electric & Manufacturing Company; while the combination of the two blade-portions 37 and 38 to ventilate the power-plant is more specifically described and claimed in an application of G. A. Moore, Serial No. 304,521, filed November 15, 1939.

While we have illustrated our invention in two illustrated forms of embodiment, we wish it to be understood that these forms of embodiment are merely illustrative, and that many changes may be made by those skilled in the art, in details of execution. We desire, therefore, that the appended claims shall be accorded the broadest construction consistent with their language and the prior art.

We claim as our invention:

1. A dynamoelectric machine having a rotor-member comprising an annular pipe-like spider, an annular armature-core mounted on the spider, said core having peripheral slots, an armature-winding having portions lying in said slots and end-portions overhanging said core, a stator-member surrounding said armature-core, and ventilating-means for causing the flow of a gaseous cooling-medium through the parts; said spider having a substantially integral front end-plate portion at one end, an intermediate core-supporting seat-portion, a rear-end seat-portion, and a separate rear end-plate member rigidly secured on said rear-end seat-portion; said rear end-plate member comprising a front end constituting the rear end-plate engaging the armature-core, an intermediate tubular portion tightly encircling said rear-end seat-portion, a rear-end flange extending away from the axis, and a ventilating fan carried by said rear-end flange; said spider having a plurality of axially extending peripheral ventilating-slots underlying, and extending beyond, said intermediate core-supporting portion; the front end-plate portion and the rear end-plate member having ventilating-openings registering with said spider-slots.

2. A dynamoelectric machine comprising an annular spider adapted to be overhangingly mounted on an overhanging shaft-end, an annular armature-core mounted on the spider, said core having peripheral slots, an armature-winding having portions lying in said slots and end-portions overhanging said core, a stator-member surrounding said armature-core, and ventilating-means for causing the flow of a gaseous cooling-medium through the parts; said spider having a substantially integral front end-plate portion at its overhanging end, an intermediate core-supporting seat-portion, a rear-end seat-portion, and a separate rear end-plate member rigidly secured on said rear-end seat-portion; said rear end-plate member comprising a front end constituting the rear end-plate engaging the armature-core, an intermediate tubular portion tightly encircling said rear-end seat-portion, a rear-end flange extending away from the axis, and a ventilating fan carried by said rear-end flange; said spider having a plurality of axially extending peripheral ventilating-slots underlying, and extending beyond, said intermediate core-supporting portion; the front end-plate portion and the rear end-plate member having ventilating-openings registering with said spider-slots.

3. A dynamoelectric machine comprising an annular spider adapted to be overhangingly mounted on an overhanging shaft-end, an annular armature-core mounted on the spider, said core having peripheral slots, an armature-winding having portions lying in said slots and end-portions overhanging said core, a stator-member surrounding said armature-core, and ventilating-means for causing the flow of a gaseous cooling-medium through the parts; said spider having a substantially integral front end-plate portion at its overhanging end, a front-end annular extension at the overhanging end thereof, beyond said front end-plate portion, an intermediate core-supporting seat-portion, a rear-end seat-portion, a current-collecting device insulatedly mounted on said front-end annular extension, and a separate rear end-plate member rigidly secured on said rear-end seat-portion; said rear end-plate member comprising a front end constituting the rear end-plate engaging the armature-core, an intermediate tubular portion tightly encircling said rear-end seat-portion, a rear-end flange extending away from the axis, and a ventilating fan carried by said rear-end flange; said spider having a plurality of axially extending peripheral ventilating-slots underlying, and extending beyond, said intermediate core-supporting portion; the front end-plate portion having axially extending ventilating-openings registering with said spider-slots; the rear part of said front-end annular extension of the spider having, in effect, radially extending ventilating-openings registering with said axially extending ventilating-openings of said front end-plate portion; and the intermediate tubular portion of said rear end-plate member having, in effect, radially extending ventilating openings registering with said spider-slots.

4. A dynamoelectric machine comprising a rotatably mounted shaft, an annular spider mounted on said shaft, an annular armature-core mounted on the spider, said core having peripheral slots, an armature-winding having portions lying in said slots and end-portions overhanging said core, a stator-member surrounding said armature-core, and ventilating-means for causing the flow of a gaseous cooling-medium through the parts; said spider having a pipe-like core-supporting seat-portion and a substantially integral pipe-like extension-portion at one end of said core-supporting seat-portion; said spider having a plurality of axially extending peripheral ventilating-slots in said pipe-like core-supporting seat-portion and extending therebeyond into a portion, but not all, of said pipe-like extension-portion; the unslotted part of said pipe-like extension-portion having a radial thickness materially greater than the thickness of said core-supporting seat-portion underneath said ventilating-slots.

5. A dynamoelectric machine having a rotor-member comprising an annular pipe-like spider, an annular armature-core mounted on the spider, said spider having a pipe-like core-supporting seat-portion and a substantially integral pipe-like extension-seat portion at one end of said core-supporting seat-portion, a separate rotor-portion mounted on said pipe-like extension-seat portion and having a flange serving as an end-plate for the armature-core, said armature-core having peripheral slots, an armature-winding having portions lying in said slots and end-portions overhanging said core, a stator-member surrounding said armature-core, and ventilating-means for causing the flow of a gaseous cooling-medium through the parts; said spider having a plurality of axially extending peripheral ventilating-slots in said pipe-like core-supporting seat-portion and extending therebeyond into a portion, but not all, of said pipe-like extension-seat portion; the unslotted part of said pipe-like extension-seat portion having a radial thickness materially greater than the thickness of said core-supporting seat-portion underneath said ventilating-slots.

6. A dynamoelectric machine having a rotor-member comprising an annular pipe-like spider, an annular armature-core mounted on the spider, said spider having a pipe-like core-supporting seat-portion and a substantially integral pipe-like extension-seat portion at one end of said core-supporting seat-portion, a separate rotor-portion mounted on said pipe-like extension-seat portion, said separate rotor-portion comprising an intermediate tubular portion tightly encircling said pipe-like extension-seat portion, an end-flange at one end serving as an end-plate for the armature-core, and a fan-member at the other end, said armature-core having peripheral slots, an armature-winding having portions lying in said slots and end-portions overhanging said core, and a stator-member surrounding said armature-core; said spider having a plurality of axially extending peripheral ventilating-slots in said pipe-like core-supporting seat-portion and extending therebeyond into a portion, but not all, of said pipe-like extension-seat portion; the unslotted part of said pipe-like extension-seat portion having a radial thickness materially greater than the thickness of said core-supporting seat-portion underneath said ventilating-slots; said separate rotor-portion having ventilating-openings registering with said spider-slots.

7. A dynamoelectric machine comprising a rotatably mounted shaft, an annular spider mounted on said shaft, an annular armature-core mounted on the spider, said core having peripheral slots, an armature-winding having portions lying in said slots and end-portions overhanging said core, a stator-member surrounding said armature-core, said spider having a pipe-like core-supporting seat-portion and a substantially integral pipe-like extension-portion at one end of said core-supporting seat-portion, said spider having a plurality of axially extending peripheral ventilating-slots in said pipe-like core-supporting seat-portion and extending therebeyond into a portion, but not all, of said pipe-like extension-portion, the unslotted part of said pipe-like extension-portion having a radial thickness materially greater than the thickness of said core-supporting seat-portion underneath said ventilating-slots, and a fan-member mounted in spaced relation to one end of the armature-core, said fan-member having plate and fan-blade means so disposed with respect to the ventilating slots of the spider and the overhanging end-portions of the armature-winding in such manner as to draw air axially through said ventilating-slots of the spider and to cause such air to flow at least partially over the overhanging armature-winding end-portions at that end of the core.

8. A dynamoelectric machine comprising a rotatably mounted shaft, an annular spider mounted on said shaft, an annular armature-core mounted on the spider, said core having peripheral slots, an armature-winding having portions lying in said slots and end-portions overhanging said core, a stator-member surrounding said armature-core, said spider having a pipe-like core-supporting seat-portion encircling said shaft and a substantially integral pipe-like front-end extension-portion having an air-admitting ventilating-space within its bore, said spider having a plurality of axially extending peripheral ventilating-slots in said pipe-like core-supporting seat-portion and extending therebeyond into communication with the bore of said front-end extension and also in communication with the space underneath the front-end overhanging end-portions of the armature-winding, and a fan-member mounted in spaced relation to the rear end of the armature-core, said fan-member having plate and fan-blade means so disposed with respect to the ventilating slots of the spider and the overhanging end-portions of the armature-winding in such manner as to draw air axially through said ventilating-slots of the spider and to cause such air to flow at least partially over the overhanging rear-end overhanging end-portions of the armature-winding.

GEORGE A. MOORE.
      ERICH O. MUELLER.